A. P. KNAPP.
STRAINING MILK CAN.

No. 175,712.  Patented April 4, 1876.

WITNESSES:
Francis McArdle,
John Goethals

INVENTOR:
A. P. Knapp
BY
Munn
ATTORNEYS.

UNITED STATES PATENT OFFICE.

ALBERT P. KNAPP, OF RANDOLPH, NEW YORK.

IMPROVEMENT IN STRAINING MILK-CANS.

Specification forming part of Letters Patent No. 175,712, dated April 4, 1876; application filed January 22, 1876.

*To all whom it may concern:*

Be it known that I, ALBERT P. KNAPP, of Randolph, Cattaraugus county, New York, have invented a new and Improved Milk-Strainer, of which the following is a specification:

My invention relates to strainers for straining milk into cans, such as are used for carrying milk from the dairy to the factory; and it consists of a flat-sided can for hanging against a support by hooks at the top, made round or curved, so as to be convenient to use and clean, and so that the body can be made out of one piece of metal; also, a breast applied to the top to prevent the milk from slopping out, and to serve for a handle; also, a hoop fitted around the bottom, to protect the strainer and the bottom, said hoop having holes punched in it, so that it may be used for straining into a pan; and, also, the strainer fitted in a small opening in the bottom, the bottom being struck down or concaved, so that the milk may flow toward the center, and only occupies a portion of the neck of the can, thus allowing the animal heat of the milk to escape when filling the cans.

Figure 1:
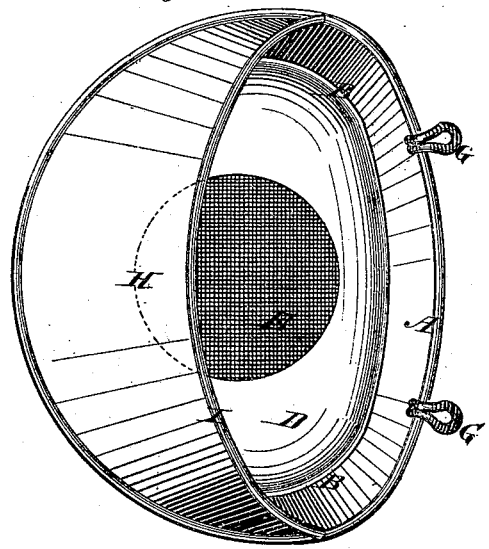
Figure 2:
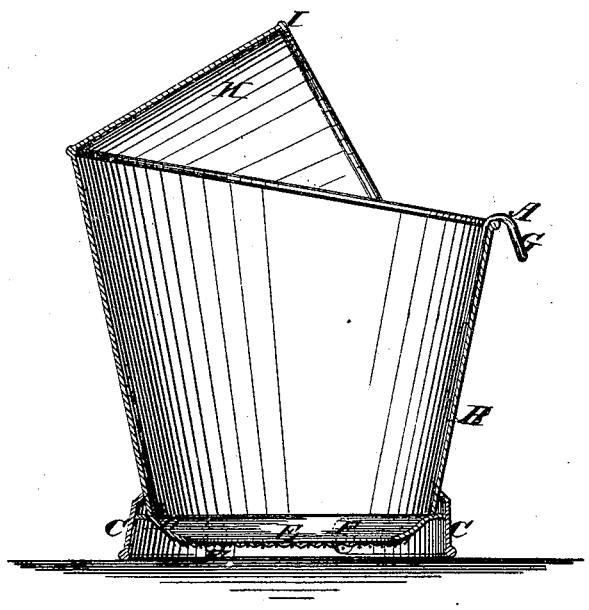

Figure 1 is a top view of my improved can, and Fig. 2 is a sectional elevation.

Similar letters of reference indicate corresponding parts.

A is the flat side of the strainer-body, which I propose to construct round or curved, and without corners, as at B, instead of making them angular, as heretofore, thus making the can smoother inside and better to clean, also stronger and more durable. C is the hoop, which I apply to the lower end for protecting the bottom D and the strainer E, said hoop being provided with holes F, so that the can may be set in a pan for use in connection therewith, as well as straining into cans for which it is mainly intended, being contrived to set on the top of the can, while, at the same time, hanging from a support by the hooks G to prevent falling off.

H is the breast, to prevent the milk from slopping over, and being contrived so as to serve as a handle to the strainer, being extended from the body, so that its upper edge I comes over the middle of the can, or thereabout, suitably for that purpose.

The bottom is struck down in the concave form represented, and the strainer is fitted in the middle portion considerably smaller than the top of the can, so that plenty of space may be had around the stream of milk flowing into the can from the strainer for the escape of the animal heat.

The bottom is represented in this example as being soldered to the body; but they may, in practice, be struck out of one piece.

Having thus described my invention, I claim as new and desire to secure by Letters Patent—

As a new article of manufacture, a milk-strainer consisting of a body having flat side A, curved at B, and having breast H, the hoop C diverging downward below body, and the bottom D having a concave strainer, E, all constructed and arranged substantially as and for the purpose specified.

ALBERT P. KNAPP.

Witnesses:
 EMMETT S. KNAPP,
 R. L. HENDERSON.